Figure 1:
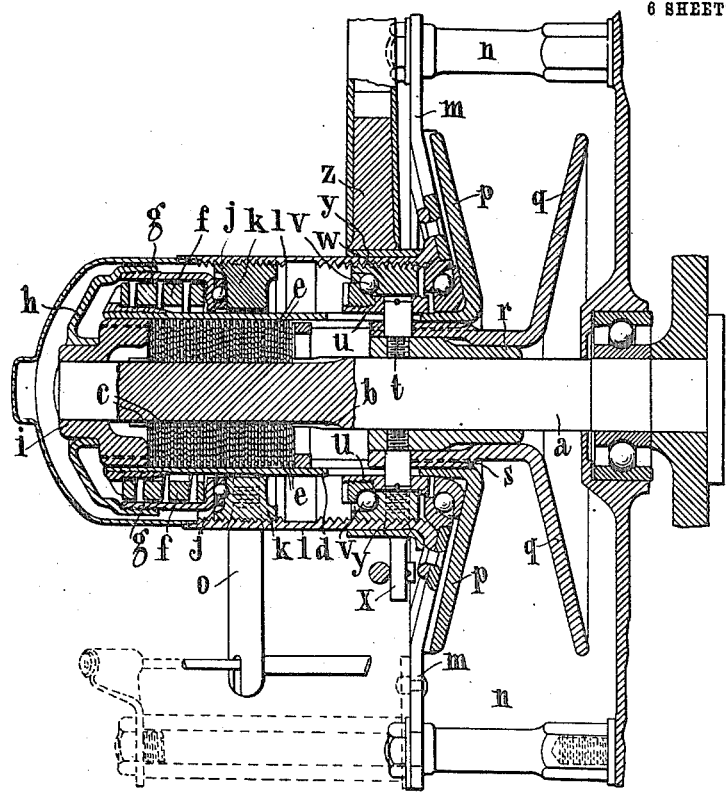

J. V. PUGH & F. POUNTNEY.
COMBINED CLUTCH AND SPEED VARYING PULLEY.
APPLICATION FILED OCT. 18, 1912.

1,068,364.

Patented July 22, 1913.

6 SHEETS—SHEET 1.

Witnesses:

Inventors:
John Vernon Pugh,
Frank Pountney,
by
Attorneys.

J. V. PUGH & F. POUNTNEY.
COMBINED CLUTCH AND SPEED VARYING PULLEY.
APPLICATION FILED OCT. 18, 1912.
1,068,364.
Patented July 22, 1913.
6 SHEETS—SHEET 2.
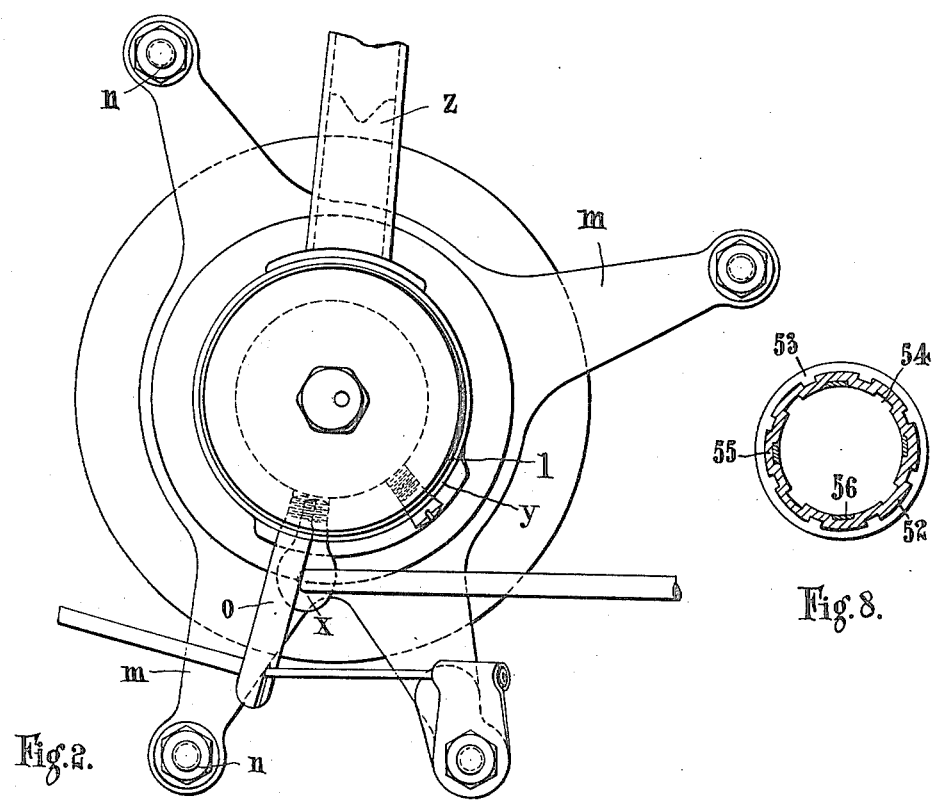

UNITED STATES PATENT OFFICE.

JOHN VERNON PUGH AND FRANK POUNTNEY, OF COVENTRY, ENGLAND, ASSIGNORS TO RUDGE WHITWORTH LIMITED, OF COVENTRY, ENGLAND.

COMBINED CLUTCH AND SPEED-VARYING PULLEY.

1,068,364.

Specification of Letters Patent.

Patented July 22, 1913.

Application filed October 18, 1912. Serial No. 726,581.

*To all whom it may concern:*

Be it known that we, JOHN VERNON PUGH, a subject of the King of Great Britain and Ireland, and residing at Guiting House, Allesley, Coventry, in the county of Warwick, England, and FRANK POUNTNEY, a subject of the King of Great Britain and Ireland, and residing at 26 Regent street, Coventry, in the county of Warwick, England, have invented certain new and useful Improvements in a Combined Clutch and Speed-Varying Pulley, of which the following is a specification.

This invention relates to a combined clutch and variable speed driving pulley for motor cycles and the like of the type in which the variation of speed is produced by varying the distance between the two cone elements of the driving pulley. Driving pulleys of the above type previously proposed for use without a clutch have been open to certain disadvantages, being in some cases arranged in such a way that if the cones of the driving pulley are separated beyond a certain point the belt ceases to grip the surfaces of the cones, and is carried upon a free running ring so that no drive is transmitted. In such an arrangement it is impossible to allow the engine to run free except when the pulley has been driving at its lowest speed and when the engine begins to drive the machine after running free the pulley does not at first grip the belt tightly, and a large amount of slipping takes place, resulting in injury to the belt, it being impossible for the engine to make the machine run immediately at its corresponding speed without first gradually accelerating it. Other constructions have also been proposed in which a multi-plate clutch is provided but it is only arranged to be operated after the pulley has reached the lowest speed, while at the same time an axial thrust due to the clutch spring is thrown upon the engine shaft. All such arrangements are open to various objections, and the same may be said of a variable speed pulley positioned at the external end of a clutch, or one made of such an increased diameter that it may be carried upon the shell containing the clutch disks.

The object of the present invention is to overcome the foregoing and other disadvantages, and to provide a compact and reliable form of such device.

The invention consists for this purpose in a combined multi-plate clutch and variable speed driving pulley for motor cycles and the like, having in combination with a driving pulley in which the distance between the two cone elements of the driving pulley is variable to regulate the speed ratio while the machine is running, a multi-plate friction clutch co-axial with the engine shaft and so arranged that a free running engine is obtainable without altering the speed ratio, the engine shaft being relieved of all axial thrust due to the clutch spring or belt.

The invention also consists in a combined adjustable cone driving pulley and multi-plate friction clutch for motor cycles and the like, in which a cam plate pivotally mounted between the engine case and the back of the sliding cone and provided with actuating means is capable of a small angular movement and engages upon one side fixed helical or inclined surfaces which impart an axial movement thereto, and carries upon the other side a ball thrust bearing which supports and operates upon the back of the sliding cone of the driving pulley.

The invention further consists in a combined adjustable cone driving pulley and multi-plate friction clutch for motor cycles and the like, in which the clutch is controlled by the axial movement of a non-rotatable external tube or sleeve engaging helical or inclined cam-like surfaces on a member capable of a small rotational movement relative thereto.

The invention also consists in a combined adjustable cone driving pulley and multi-plate friction clutch for motor cycles and the like in which the sliding cone element accurately fits and is mounted for axial movement upon a cylindrical sleeve-like extension of the other cone element, relative rotation of the cones being prevented by engaging means which do not affect the surface of the cylindrical extension upon which the sliding cone is supported.

The invention further consists in a combined adjustable cone driving pulley and multi-plate friction clutch for motor cycles and the like in which the cone elements are supported in an axial direction by ball thrust bearings which are preferably free from any centralizing effect.

The invention further consists in a combined adjustable cone driving pulley and multi-plate friction clutch for motor cycles and the like in which means are provided to prevent unintentional separation of the parts of the ball thrust bearing between the sliding cone element and the cam plate by means of which it is adjusted.

The invention also consists in combined variable speed driving pulleys and multi-plate friction clutches for motor cycles and the like as hereinafter described.

Figure 3:
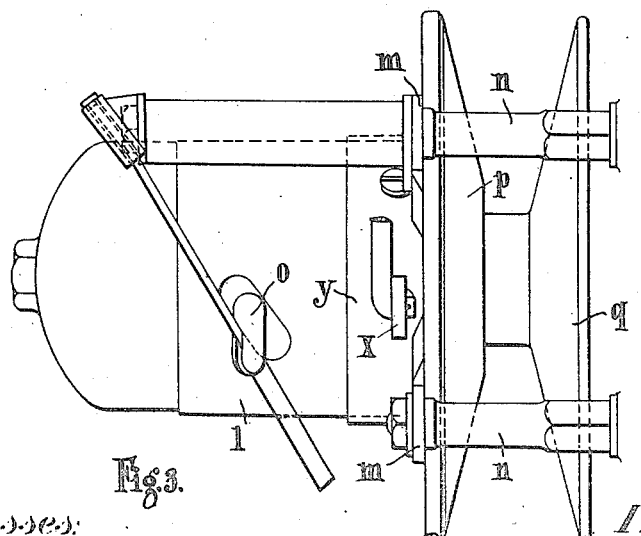
Figure 4:
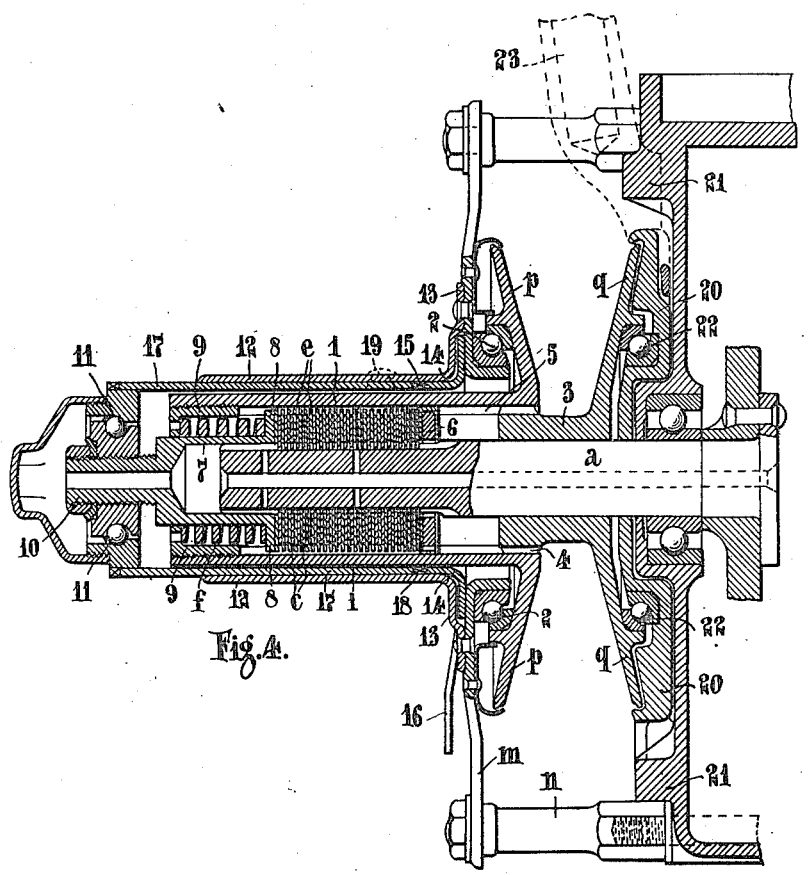
Figure 5:
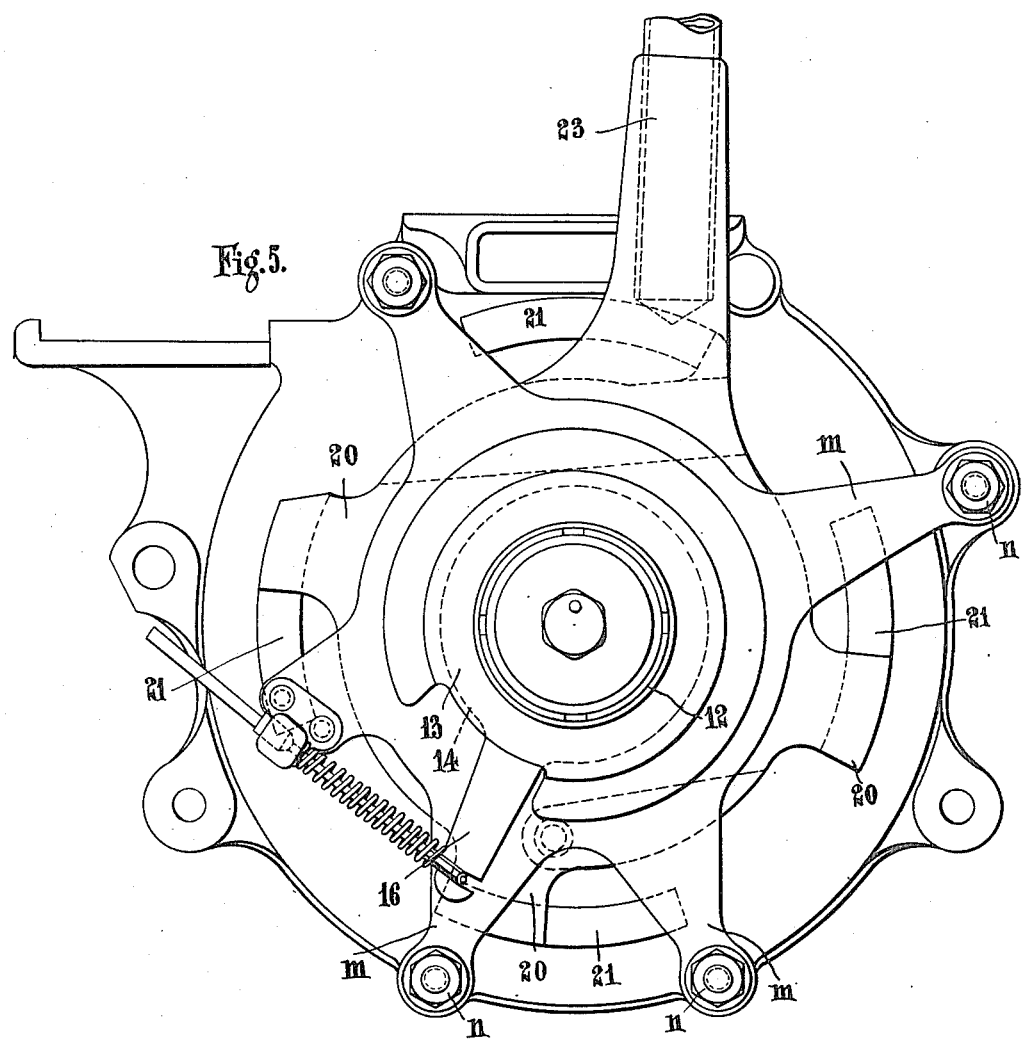
Figure 6:
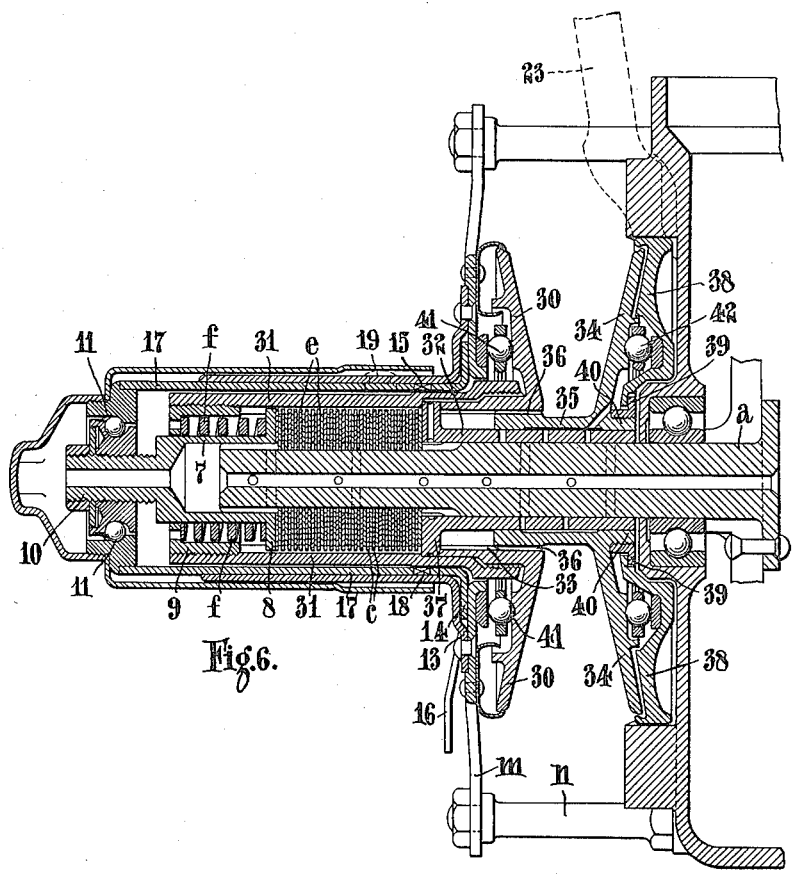
Figure 7:
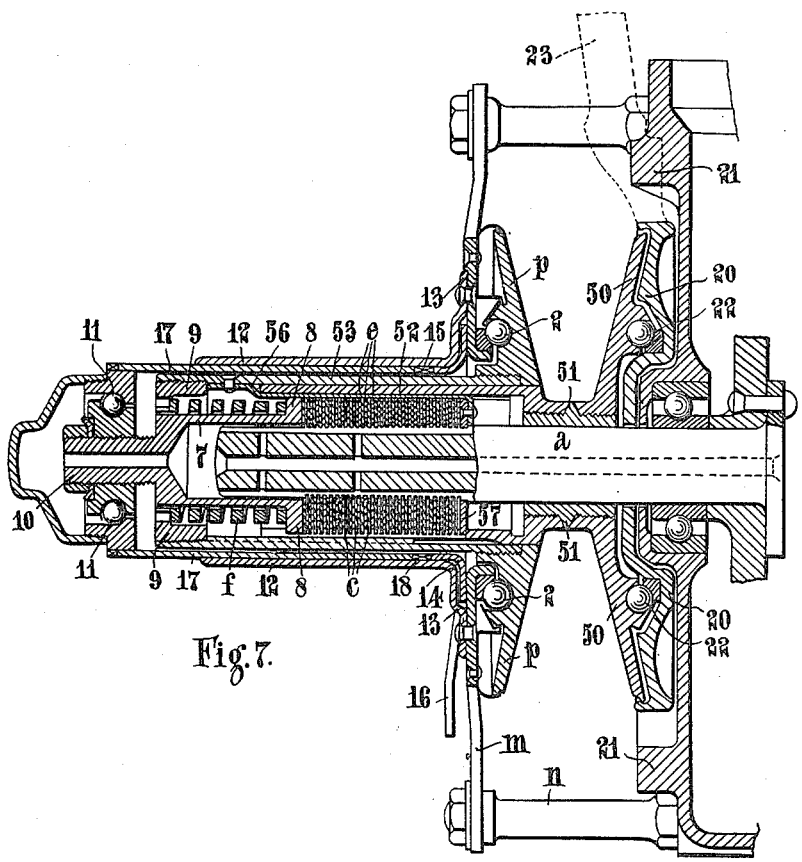

Referring now to the accompanying drawings which illustrate some methods of carrying the invention into effect, Figures 1, 2 and 3 are views of one form of the combined variable speed driving pulley and multi-plate friction clutch. Figs. 4 and 5 show a modified form. Fig. 6 shows another method of carrying the invention into effect, and Figs. 7 and 8 show a further modification.

In carrying the invention into effect in one form as shown by way of example in Figs. 1, 2 and 3, the engine shaft $a$ is provided near its end with means such as the grooves $b$ for engaging the alternate plates $c$ of a multi-plate friction clutch. A hollow sleeve $d$ is mounted concentric with the shaft $a$, so as to be rotatable therewith when required, this sleeve $d$ containing the other plates $e$ of the clutch. Upon the outside of the sleeve $d$ is a strong spring $f$ for applying pressure to the plates of the clutch by means of a box $g$, cap $h$ and bearing bush $i$, and bearing upon the end of the box $g$ by means of the thrust bearing $j$ is the operating collar $k$, for disengaging the clutch. This collar $k$ is provided externally with screw threads of considerable inclination and engages with similar threads formed within a fixed outer sleeve $l$, attached to the engine case by the armed member $m$ and studs $n$. A stud or arm $o$ attached to the collar $k$ projects through the sleeve $l$, and works in a slot cut to the same angle as the threads so that motion may be transmitted to the collar by means of this arm to disengage the clutch. The rotatable sleeve $d$ which carries the clutch plates $e$ is extended toward the engine case and has formed integral therewith the non-adjustable cone member $p$ of the driving pulley. The sliding cone member $q$ of the pulley is fitted with a bush $r$ and mounted upon a plain part of the shaft $a$, being provided with a boss which extends into the sleeve $d$, by which it is rotated by means of the longitudinal feathers $s$. The sliding member $q$ of the driving pulley is free to move longitudinally upon the shaft $a$, and attached to the boss thereof are small studs $t$ which project through longitudinal slots in the sleeve $d$. These studs engage on the outside of the sleeve a ring $u$ which by means of a ball-bearing $v$ is in connection with and may be moved axially by a second collar $w$, which is also provided externally with screw threads to engage other screw threads provided in the fixed outer sleeve, the threads being similar to those previously referred to. An arm or stud $x$ projects from the collar $w$ working in a slot in the sleeve $l$ in the same manner as already described with reference to the clutch operating collar $k$. This stud $x$ connects the collar with a ring $y$ working freely on the outside of the sleeve $l$, and to this ring is attached a lever arm $z$ by means of which movement is imparted to the collar $w$, and consequently to the sliding cone member $q$ of the pulley. Means is provided for actuating the clutch operating arm $o$ which projects through the external sleeve $l$ from a lever or the like fixed upon the handle bars or other convenient position such as the lever $z$, flexible wires or other suitable means being employed, and from the stud $x$ a connection may be made to an adjustable driving pulley on the back wheel of the cycle, or the combined clutch and variable speed pulley may be used in connection with any other means for adjusting the belt to the variable diameter of the driving pulley.

In the modification shown in Figs. 4 and 5 the driving shaft $a$ of the engine is extended upon one side of the crank case and parallel to this side and carried upon studs $n$ projecting therefrom is a star-like member or attachment plate $m$ having an open center through which the shaft passes. The adjustable cone pulley is freely rotatable upon the driving shaft and occupies a space between the attachment plate and the side of the crank case. It is formed of two cones $p$ and $q$, the cone $p$ which does not move axially during adjustment being provided with a long hollow sleeve 1, which envelops the driving shaft and extends outwardly through the open center of the attachment plate $m$, a ball thrust bearing 2 being provided between this plate $m$ and the back face of the pulley cone $p$. The sliding cone $q$, is mounted upon the shaft $a$ adjacent to the side of the crank case, and is provided with a central boss 3, which slides within the sleeve 1 of the other cone $p$. Projections 4 are provided to engage the grooves 5 in the sleeve 1, and so prevent the rotation of one cone relative to the other. An annular space is formed between the shaft $a$ and the before mentioned pulley cone sleeve 1, and within a portion of this space are fitted the plates $c$ and $e$ of the multi-plate friction clutch. The plates engage alternately with the inside of the sleeve 1 and the shaft $a$ in the usual well known manner and at the inner end of the plates a stop or thrust collar 6 is fastened within the sleeve 1, the space between the plate stop 6 and the inner end of the sleeve 1 being occupied by the boss 3 of the movable cone $q$ before referred to. Between the outer end of the clutch plates and the outer end of the pulley cone sleeve 1 is situated the clutch spring $f$ which is carried upon a hollow cylindrical member 7 sliding upon the end of the shaft $a$ and provided at its inner end with a flange 8 which abuts against the clutch plates; a cap or spring box 9 screwed into the end of the pulley cone sleeve 1 retains the spring and allows of adjustment of the pressure if so desired. The hollow cylindrical spring carrier 7 passes through the end of the spring box 9 and is extended beyond the outer end of the shaft $a$; this extended part 10 is of smaller diameter and carries a ball thrust bearing 11 through the intermediary of which the pressure of the spring on the clutch plates may be relieved. External to the pulley cone sleeve 1 and separated therefrom by a narrow annular space is a tubular outer shell 12 having a dish-shaped flange 13, which flange is fastened at its outer rim against the outer side of the attachment plate $m$ thus leaving a flat circular space between the latter and the recessed central portion of the dish-shaped flange. This space is in communication with the narrow annular space before mentioned. Within the circular space and projecting a short distance into the annular space is a flanged ring 14 of L shaped section having helical or inclined cam surfaces 15 formed upon the end of its tubular part and an operating lever 16 extending from the edge of the flange. This operating lever 16 projects through a slot formed by the removal of a part of the outer rim of the dish-shaped flange 13, which slot allows an angular movement of the lever 16 resulting in a small rotational movement of the flanged ring 14. The lever may be operated by a Bowden wire or other suitable connection from an operating device fastened in any convenient position, say for example on the handle bars or the cam plate arm hereinafter described. Telescoping within the tubular outer shell 12, in the narrow annular space is a tube or operating sleeve 17 having at its inner end cam surfaces 18 which engage those formed upon the flanged ring 14. This operating sleeve 17 is prevented from rotating, by a stop 19 and is therefore moved longitudinally by means of the co-acting cam surfaces. The outer end of this sleeve 17 is connected to the ball thrust bearing 11 attached to the clutch spring carrier 7, and by this means the clutch is operated. Between the sliding cone $q$ and the side of the engine case there is a disk-like member or cam plate 20 which engages on its inner side with helical or inclined cam surfaces 21 formed upon the side of the engine case, a ball thrust bearing 22 being provided between the other side and the back of the sliding cone $q$. The cam plate is provided with an arm 23 which extends in an upward direction for some distance. This arm is capable of a small angular movement about the axis of the engine shaft $a$, and readily releasable means may be provided for holding it in any desired position. When given a rotational movement by means of the extended arm 23 the cam plate 20 is moved in an axial direction by its engagement with the helical surfaces 21 on the side of the engine case and in this way the adjustment of the cone pulley is effected.

In the previously described forms the sliding cone is mounted directly upon the engine shaft $a$, but in the modification shown in Fig. 6 a different arrangement is adopted. The non-adjustable cone 30 is rigidly connected with the sleeve 31, within which is securely fastened by means of a flange 37 formed at its outer end another sleeve 32 which is rotationally mounted upon the engine shaft $a$. For about half of its length this second sleeve 32 lies within the hollow central portion of the cone 30. Around the outer circumference of the inner part of the boss 35 are serrations engaging serrations or the like 33 on the interior of the hollow central portion of the cone 30 for the purpose hereinafter described. The sliding cone 34 is mounted upon the sleeve 32 and is provided with a central boss 35 which projects into the hollow central portion of the cone 30, the outer end of this boss being provided with projections 36 for engaging the serrations 33 formed on the interior of said cone 30, so that any rotational movement between the two cones is prevented. The bore of the pulley boss and the external surface of the sleeve are ground or otherwise made to fit one another very accurately, and as the wear due to the axial movement only is very slight a good fit is maintained, and it will not be possible for the pressure of the belt to produce any tilting of the sliding cone element. The annular space formed between the shaft and the pulley cone sleeve 31 contains the plates of the multiplate friction clutch as in the previous form, and at the inner end the plates abut against the flange 37 of the before mentioned inner sleeve 32 which thus forms a stop or thrust collar. The cam plate 38 is rotatably mounted upon and retained in connection with the sliding cone 34 by a flanged collar 39 screwed upon a boss 40 on the inner side of the cone. The cam plate engages inclined surfaces formed upon the side of the engine case, and has a thrust ball bearing between the outer side and the back of the sliding cone together with an operating arm as already described in the previous form. The ball thrust bearing 41 at the back of the non-adjustable cone 30 is preferably constructed as shown so as to impose no centralizing effect upon the cone and the ball bearing 42 at the back of the sliding cone may also be arranged so as to be free of any centralizing effect, the cam plate being provided with clearance in its cylindrical engagement with the cone. Under these circumstances the cam plate may be centralized by engaging with a cylindrical surface upon the engine case, or if preferred, large diameter screw threads may be employed in place of the inclined surfaces, the latter plan avoiding any sidewise tilting of the cam plate.

In another modification shown in Figs. 7 and 8 the sliding cone 50 is rigidly attached to a bush 51, which is mounted and freely movable upon the engine shaft. Attached to and projecting from the outer end of the said bush is a long sleeve 52, which slides within and extends for the greater part of the length of the sleeve 53, projecting from the outer end of the non-adjustable cone $p$, grooves and projections being provided as shown in Fig. 8, to prevent the rotation of one sleeve relative to the other. The clutch plates are fitted between the inner sleeve 52 and the engine shaft $a$. The shaft $a$ has longitudinal grooves for the engagement of alternate clutch plates of the series and the sleeve has longitudinal grooves for the engagement of the other plates of the series. Between the grooves 54, for engaging the plates the sleeve 52 is provided with other grooves 55 within which lie flat tension rods 56 which are connected at their outer ends to the inside of the outer sleeve 53 in connection with the non-adjustable cone $p$, the inner ends of the rods 56 carrying a stop plate 57 for the clutch plates. It will be seen that by the foregoing arrangements the two cone elements of the pulley are well supported in connection with one another, and thus any tilting or wabbling of the cones is avoided.

This invention may be used in connection with an adjustable driven pulley on the road wheel or with any other type of pulley in which an adjustable driving pulley is used, and it is clear that many modifications may be made in the construction and manner of carrying this invention into effect without in any way departing from the spirit of the same.

Having now described our invention, what we claim as new and desire to secure by Letters Patent is:—

1. In combination in a motor cycle, a power shaft, a driving pulley concentric therewith, means for varying the effective diameter of said pulley while in motion, friction clutch means positioned concentrically between said shaft and said pulley, means for operating the clutch operable at all diameters of said pulley, and means for balancing the axial thrusts from said pulley and clutch in all positions thereof independent of the shaft whereby said shaft is relieved therefrom.

2. In combination a driving shaft, an expansible pulley having a non-adjustable and an adjustable cone member, means for axially moving the adjustable member while rotating, friction clutch means within a hollow extension of one pulley member and engaging said shaft, means for operating the clutch to disengage a spring acting axially to apply said clutch, abutments to said extension taking the spring thrust when the clutch is applied, and frame parts supporting said pulley members axially, the said clutch disengaging means and said hollow extension transmitting the spring thrust to said frame parts when the clutch is disengaged.

3. In combination in a motor cycle, a motor case and a shaft, a cone member concentric with said shaft, a second cone member, rotating with but axially movable relative to said first cone member, said two members forming an adjustable grooved pulley, a member between said case and said second cone member mounted to move pivotally about said shaft and engaging helical surfaces provided on said case, whereby upon angular movement said second cone member is moved axially, a ball thrust bearing for imparting axial motion from said last mentioned member to said second cone member whereby said pulley is adjustable while in motion, friction clutch means positioned concentrically between said shaft and said pulley, operable at all diameters of said pulley and means for balancing the axial thrusts from said pulley and clutch in all positions thereof independent of the shaft, whereby said shaft is relieved therefrom.

4. In combination in a motor cycle, a power shaft, a driving pulley concentric therewith, means for varying the effective diameter of said pulley while in motion, spring-applied friction clutch means positioned concentrically between said shaft and said pulley operable at all diameters of said pulley, a non-rotatable sleeve axially movable to disengage said clutch by relieving the spring pressure thereon, a member capable of angular movement and having helical surfaces arranged to operate said sleeve, and means for balancing the axial thrust of said pulley and clutch in all positions thereof, independent of the power shaft, whereby said shaft is relieved therefrom.

5. In combination a driving shaft, a non-adjustable cone member of an expansible pulley thereon, a truly cylindrical extended sleeve attached to said member, an adjustable cone member slidable and having an extended bearing on said sleeve to maintain alinement of said members; means separate from said sleeve to insure joint rotation of said members, means for axially moving said adjustable member while rotating, friction clutch means within a hollow extension of said non-adjustable member and engaging said shaft, means for operating said clutch to disengage a spring acting axially to apply said clutch, abutments to said extension taking the spring thrust when the clutch is applied, and frame parts supporting said pulley members axially, the said clutch disengaging means and said hollow extension transmitting the spring thrust to said frame parts when the clutch is disengaged.

6. In combination in a motor cycle, a power shaft, a cone member concentric therewith, a second cone member rotating with but axially movable relative to said first cone member, said two members forming a grooved pulley adjustable while in motion, non-centering ball thrust bearings supporting each of said cone members in an axial direction only, friction clutch means positioned concentrically between said shaft and said pulley, operable at all diameters of said pulley, and means for balancing the axial thrust from said pulley and clutch in all positions thereof, independent of the power shaft, whereby said shaft is relieved therefrom.

7. In combination in a motor cycle, a motor case and shaft, a cone member concentric with said shaft, a second cone member rotating with but axially movable relative to said first cone member, said members forming an adjustable grooved pulley, a member between said case and said second cone member mounted to move pivotally about said shaft, and engaging helical surfaces provided upon said case, whereby upon angular movement said second cone member is moved axially, a ball thrust bearing for imparting axial motion from said last mentioned member to said second cone member whereby said pulley is adjustable while in motion, means for retaining said two last mentioned members in connection axially, multi-plate friction clutch means positioned concentrically between said shaft and said pulley, operable at all diameters of said pulley, and means for balancing the axial thrust from said pulley and clutch in all positions thereof, independent of the power shaft, whereby said shaft is relieved therefrom.

8. In combination in a motor cycle, a motor case and a shaft, a cone member concentric with said shaft, a sleeve attached to said member and having a wholly cylindrical external surface, a second cone member having an extended boss slidably mounted upon said sleeve whereby true alinement of said cones is maintained under all conditions, engaging means whereby said cone members rotate together to form an adjustable grooved pulley, helical surfaces provided on said motor case, a member between said case and said second cone member mounted to move pivotally about said shaft and engaging said surfaces, whereby upon angular movement said second cone member is moved axially, a ball thrust bearing for imparting axial motion from said pivotally mounted member to said second cone member whereby said pulley is adjustable while in motion, means for retaining said two last mentioned members in connection axially, a ball thrust bearing supporting said first cone member, both of said ball bearings being non-centering and acting in an axial direction only, spring-applied friction clutch means positioned concentrically between said shaft and said pulley, operable at all diameters of said pulley, a non-rotatable sleeve axially movable to disengage said clutch by relieving the spring pressure thereon, a member capable of angular movement and having helical surfaces arranged to operate said sleeve and means for balancing the axial thrust of said pulley and clutch in all positions thereof whereby said engine shaft is relieved therefrom.

9. In combination in a motor cycle, a motor case and a shaft, a plate supported at a distance from said case, a cone member concentric with said shaft, a second cone member rotating with but axially movable relative to said first cone member, said two members forming an adjustable grooved pulley situated between said plate and said case, a movable part coacting with said case axially to move said second cone member, a ball thrust bearing between said first cone member and the inner side of said plate, a like bearing between said second cone member and said movable part, a hollow sleeve to said first cone member projecting through said plate, internal abutments in said sleeve, multi-plate friction clutch disks within said sleeve alternately engaging said shaft and said sleeve, a spring within said sleeve applying pressure to said disks in virtue of said abutments, a flanged member transmitting the pressure of said spring to said disks and extending without said sleeve, a sliding non-rotatable sleeve surrounding said hollow sleeve, a ball thrust bearing connecting said sliding sleeve with said flanged member and a cylindrical member between said sliding sleeve and the outer side of said plate having helical surfaces and acting thereby upon angular movement to control the pressure on said clutch disks.

10. In combination an engine shaft, a two-part cone pulley about the shaft, one part of which is adjustable toward and from the other to change the speed ratio, a friction clutch concentric with the shaft and between the cone pulley and said shaft, the clutch and the adjustable pulley part having their adjusting action axially of the shaft, means for operating the clutch and a frame sustaining the axial thrust of the adjustable pulley part and the clutch in the disengaged position thereof independent of the shaft which is thereby relieved of said axial thrust, substantially as described.

11. In combination, a power shaft, a fixed frame surrounding the said shaft, a pulley member surrounding the shaft and having a thrust bearing engagement with the frame, said pulley member having a sleeve extending through the said frame member, clutch means between the sleeve and shaft, controlling means for the clutch having a thrust bearing connection with the fixed frame, and a second pulley member splined to the first member and means for adjusting the latter, said means having a thrust bearing engagement with the frame.

12. In combination, a power shaft, a two-part cone pulley, one part being adjustable toward and from the other to change the speed ratio, a sleeve extending from one pulley member, a friction clutch between the same and the power shaft, a cam member turnable about the outer side of the sleeve, a connection concentric with the sleeve lying partly without and partly within the sleeve and operated axially by said turnable cam member in one direction and a spring for operating said connection in the opposite direction for controlling the clutch, a second cam member turnable about the engine shaft for adjusting the movable pulley member, and a frame for sustaining the thrust of both of said turnable cam members, substantially as described.

13. In combination in a motor cycle, a power shaft, a pulley having one cone member adjustable toward and from the other, a sleeve attached to one pulley member, a friction clutch between said sleeve and the engine shaft, a frame, a thrust bearing between the frame and the pulley, a sleeve movable axially in relation to the pulley sleeve, a connection between said axially movable sleeve and the clutch for controlling the same, a cam member having a thrust bearing against the frame and acting upon the axially movable sleeve to operate the same, and means for adjusting the adjustable pulley member, substantially as described.

14. In combination a driving shaft, an expansible pulley, having an adjustable and a non-adjustable part, spring applied friction clutch means carried by the non-adjustable part of said pulley, and engaging said shaft, abutments on said pulley part whereby the spring thrust is balanced when the clutch is engaged, means for operating the clutch, said thrust being transmitted through said pulley part in one direction, and through the clutch operating means in the other direction, a frame part for receiving said thrusts when the clutch is disengaged, an axially adjustable part to said pulley operable while rotating, and a frame part receiving the thrust from said adjustable pulley part.

In testimony whereof, we affix our signatures in presence of two witnesses.

JOHN VERNON PUGH.
FRANK POUNTNEY.

Witnesses:
ALBERT BENNION,
W. E. BLATCH.